(12) United States Patent
Christiansen et al.

(10) Patent No.: US 10,023,924 B2
(45) Date of Patent: Jul. 17, 2018

(54) METHOD FOR SOLUTION HARDENING OF A COLD DEFORMED WORKPIECE OF A PASSIVE ALLOY, AND A MEMBER SOLUTION HARDENED BY THE METHOD

(71) Applicant: EXPANITE TECHNOLOGY A/S, Hillerød (DK)

(72) Inventors: Thomas Lundin Christiansen, Frederikssund (DK); Thomas Strabo Hummelshoj, Frederiksberg (DK); Marcel A. J. Somers, Billund (DK)

(73) Assignee: EXPANITE TECHNOLOGY A/S, Hillerod (DK)

( * ) Notice: Subject to any disclaimer, the term of this patent is extended or adjusted under 35 U.S.C. 154(b) by 671 days.

(21) Appl. No.: 14/397,373

(22) PCT Filed: Apr. 25, 2013

(86) PCT No.: PCT/DK2013/050119
§ 371 (c)(1),
(2) Date: Oct. 27, 2014

(87) PCT Pub. No.: WO2013/159781
PCT Pub. Date: Oct. 31, 2013

(65) Prior Publication Data
US 2015/0132079 A1 May 14, 2015

(30) Foreign Application Priority Data

Apr. 27, 2012 (WO) ................ PCT/DK2012/050139

(51) Int. Cl.
| | |
|---|---|
| *C21D 1/06* | (2006.01) |
| *C23C 8/02* | (2006.01) |
| *C23C 8/26* | (2006.01) |
| *C23C 8/32* | (2006.01) |
| *C23C 8/34* | (2006.01) |
| *C23C 8/80* | (2006.01) |
| *C21D 6/00* | (2006.01) |
| *C21D 9/00* | (2006.01) |
| *C23C 8/38* | (2006.01) |
| *F16B 39/22* | (2006.01) |

(52) U.S. Cl.
CPC ............. *C21D 1/06* (2013.01); *C21D 6/002* (2013.01); *C21D 9/0068* (2013.01); *C23C 8/02* (2013.01); *C23C 8/26* (2013.01); *C23C 8/32* (2013.01); *C23C 8/34* (2013.01); *C23C 8/38* (2013.01); *C23C 8/80* (2013.01); *F16B 39/22* (2013.01)

(58) Field of Classification Search
CPC ....................................................... C21D 1/06
See application file for complete search history.

(56) References Cited

U.S. PATENT DOCUMENTS

| | | |
|---|---|---|
| 5,503,687 A | 4/1996 | Berns |
| 2009/0218011 A1 | 9/2009 | Blaauw et al. |

FOREIGN PATENT DOCUMENTS

| | | | |
|---|---|---|---|
| DK | PA 2011 70208 | 11/2012 | |
| EP | 1 095 170 B1 | 11/2002 | |
| EP | 2 278 038 A1 | 1/2011 | |
| WO | WO 2004/007789 A2 | 1/2004 | |
| WO | WO 2006/136166 A1 | 12/2006 | |
| WO | WO 2008/124239 A1 | 10/2008 | |
| WO | WO 2011133090 A1 * | 10/2011 | ............. B21D 53/22 |

OTHER PUBLICATIONS

International Search Report (PCT/ISA/210) dated Jul. 15, 2013, by the Danish Patent Office as the International Searching Authority for International Application No. PCT/DK2013/050119.
Christiansen, et al., "Low-temperature gaseous surface hardening of stainless steel: the current status," Feature, Int. J. Mat. Res. (formerly Z. Metallkd.) 2009, pp. 1361-1377, vol. 100, No. 10, Technical University of Denmark, Department of Mechanical Engineering, Kgs. Lyngby, Denmark.
Georgiev, et al., "Nitrogen solubility in 1.4306 and 1.4435 austenitic steels," Journal of Materials Science and Technology, 1996, pp. 28-32, vol. 4, No. 4, Institute of Metal Science, Bulgarian Academy of Sciences.
Bashchenko, et al., "Alloying iron and its alloys with nitrogen under high pressure," 1985, pp. 169-174, No. 4, Allerton Press, Inc.
Davis J. et al., "Furnace Atmospheres", ASM Handbook, Aug. 1991, vol. 4, pp. 542-567.

\* cited by examiner

*Primary Examiner* — Christopher Kessler
(74) *Attorney, Agent, or Firm* — Buchanan Ingersoll & Rooney P.C.

(57) ABSTRACT

A method for method for solution hardening of a cold deformed workpiece of a passive alloy containing at least 10% chromium, which method includes dissolving at least nitrogen in the workpiece at a temperature T1, which is higher than the solubility temperature for carbide and/or nitride and lower than the melting point of the passive alloy, wherein dissolution of nitrogen at temperature T1 is performed to obtain a diffusion depth in the range of 50 μm to 5 mm, and cooling the workpiece after the dissolution step at temperature T1 to a temperature which is lower than the temperature at which carbides and/or nitrides form in the passive alloy, wherein the cooling step takes place in an inert gas not containing nitrogen. Further, a member, such as a lock washer for securing bolts or nuts prepared using the method.

24 Claims, 6 Drawing Sheets

METHOD FOR SOLUTION HARDENING OF A COLD DEFORMED WORKPIECE OF A PASSIVE ALLOY, AND A MEMBER SOLUTION HARDENED BY THE METHOD

TECHNICAL FIELD

The invention relates to a method for solution hardening of a cold deformed workpiece of a passive alloy. The method provides a hardened alloy in which substantially no carbides and/or nitrides are formed. The method also provides a corrosion resistant surface while retaining the core strength of the material obtained from the cold deformation. The invention further relates to a member solution hardened by the method. Such members are particularly relevant in the fields of medico, food, automotive, chemical, petrochemical, pharmaceutical, marine, package, watches, cutlery/tableware, medical, energy, pulp & paper, mining, or waste water technology.

BACKGROUND

Stainless steel and other passive alloys are typically materials with good corrosion resistance, but with relatively poor tribological characteristics, e.g. adhesive wear characteristics. To solve this problem stainless steel and comparable alloys can be surface hardened at low temperature (below 450-550° C.) by dissolution of nitrogen and/or carbon, by which is obtained a zone of so-called expanded austenite or alternatively expanded martensite. This zone is a supersaturated solution of carbon and/or nitrogen in austenite or martensite and is metastable with respect to carbide/nitride formation. Such low temperature processes can be based on gas, plasma or molten salt; gas processes require use of special activation techniques, whereas for plasma and salt bath activation is immediately achieved and no special treatment is necessary. Thereby a surface zone is obtained in the material, which surface zone contains large amounts of nitrogen and/or carbon; this is due to the relatively low process temperature. The material thereby becomes surface hardened and retains its corrosion resistance. Most passive alloys, such as stainless steel, however cannot immediately be solution hardened with nitrogen and/or carbon, since these passive alloys have an impermeable oxide layer, also called the passive layer, which is the reason for the good corrosion characteristics, but which prevents solution of e.g. nitrogen and carbon. Special techniques for removal of this passive layer are therefore required. These techniques are known to the skilled person.

Most employed technological components are used in a machined condition, which means that the material is inhomogeneously cold deformed (plastically deformed). In many applications such cold deformation is desirable from a component-strength-consideration; the component would not work if it did not have the strength increase from the work hardening induced by cold deformation. This creates a big problem if such cold machined components are surface hardened in a low temperature process, so that the surface is changed to expanded austenite or martensite under uptake of nitrogen and/or carbon. The presence of plastic deformation (defects in the microstructure) in the material implies that nitrides and carbides develop easier by reaction of nitrogen and carbon with e.g. chromium (Cr), which is an alloying element in stainless steel. Consequently an amount of Cr is removed from solid solution and bound as chromium nitride/chromium carbide. This implies that the corrosion characteristics are deteriorated because less chromium is available for maintenance of the passive layer. In local areas such Cr-depletion can be pronounced and result in loss of corrosion protection at the surface of the area. The precipitation of nitrides/carbides is called sensitisation. In particular on dissolution of nitrogen this phenomenon is very pronounced, because chromium nitrides are more stable than chromium carbides and can be formed at lower temperature. This means that the temperature at the low-temperature process must be lowered (further) to avoid sensitisation, which is undesirable since the process thereby proceeds more slowly. For extreme degrees of deformation in stainless steel there is perhaps not even a lower limit to sensitisation.

At low-temperature hardening of cold deformed stainless steel workpieces sensitisation will occur in connection with the low-temperature dissolution of nitrogen and/or carbon, which takes place at temperatures below 550° C. To solve the problem with sensitisation in cold deformed materials upon low-temperature surface hardening a full annealing of the components has—where possible—been made by a so-called austenitisation in vacuum or hydrogen atmosphere. Full annealing is a process, which is carried out at temperatures above 1020° C., typically in the range 1020-1120° C. Thereby the cold deformation in the material is annihilated and the low-temperature dissolution can be carried out without the risk of sensitisation. However, the process provides the problem that the strength of the cold-worked metal is reduced—this is referred to as a so-called egg shell effect in the material, i.e. the material becomes soft with a hard thin surface, when the workpiece is subsequently low-temperature hardened. By carrying out an austenitisation the core strength of the material is reduced to that of annealed material, and this process requires that the core strength of the treated component is a design parameter of less importance.

Another possibility is to employ a carburising process where only carbon is dissolved in the material at low temperature, i.e. formation of carbon expanded austenite. Sensitisation is not as critical for carbon dissolution as it is for nitrogen dissolution (nitriding and nitrocarburising) and hence leads to less influence on the corrosion resistance. However, for components with a strong degree of cold deformation even this is considered detrimental. Another disadvantage by only employing carbon dissolution is that a lower surface hardness is obtained than for nitrogen dissolution and that the composition profile (hardness) cannot be adjusted in the same way (see e.g. EP 1095170 B1 and WO 2006/136166 A1).

In e.g. Georgiev et al, Journal of Materials Science and Technology, Vol. 4, 1996, No. 4, pp. 28 and Bashchenko et al, Izvestiya Akademii Nauk SSSR. Metally, no 4, 1985, pp. 173-178, it is shown that nitrogen and/or carbon can be dissolved in stainless steel at high temperature (above about 1050° C.) under equilibrium conditions. It is shown that by employing high temperatures the problem with permeation of the passive layer of stainless steel can be bypassed, since this becomes unstable at these high temperatures. It is also described that the solubility temperature for chromium carbide and chromium nitride lies below this temperature. Consequently, carbides and/or nitrides are not formed at these high temperatures. The solubility of nitrogen/carbon is however relatively limited and for austenitic stainless steels no actual surface hardening occurs; this applies in particular for carbon. To avoid precipitation of carbides/nitrides during cooling a fast cooling rate is required. For martensitic stainless steel types a significant hardening of the surface can take place by fast cooling; however, the hardening effect is at a significantly lower level than obtained by processes for formation of expanded austenite.

WO 2008/124239 suggests a hybrid carburisation process with intermediate rapid quench, according to which a carbon hardened surface in a metal workpiece can be formed without forming carbide precipitates by subjecting the workpiece to both high temperature carburisation and low temperature carburisation, wherein immediately after high-temperature carburisation, the workpiece is rapidly quenched to a temperature below which carbide precipitates form. The rapid quenching may be accomplished using e.g. immersion of the workpiece in water, oil or other cooling medium such as a gas or molten salt. WO 2008/124239 fails to recognize the issues of cold-deformation and formation of carbides and/or nitrides during a subsequent low-temperature hardening.

There is a need for a method which allows low temperature dissolution of nitrogen and/or carbon for hardening of passive alloys such as stainless steel, where the problems with sensitisation and/or adjusting the composition profile are solved.

To overcome the problem with sensitisation in connection with low temperature nitriding and/or carburising of cold deformed workpieces the prior art suggests to anneal the material first, so that partial or full re-crystallisation is obtained; alternatively only a recovery of the material. Thereby the cold deformation in the material, and the strengthening obtained from the cold deformation, is annihilated, but on the other hand the low temperature dissolution can be carried out without problems with sensitisation. However, this solution fails to provide components having high core strength.

The Danish patent application PA 2011 70208 discloses a method for dissolution hardening of a cold deformed workpiece of a passive metal or a passive alloy. The method comprises a first step in which nitrogen and/or carbon is dissolved in the workpiece at a temperature higher than the solubility temperature for carbide and/or nitride formation and lower than the melting point of the workpiece, and a subsequent second step, wherein nitrogen and/or carbon are dissolved at a temperature where substantially no formation of carbides and/or nitrides occurs. The method may also comprise a quick cooling from the first to the second temperature. While treatment of metals according to PA 2011 70208 provides superior characteristics compared to other processes of the prior art it is suspected that further improvements in the characteristics of the metals may be achieved.

The aim of the present invention is to provide a method, which allows solution hardening of products shaped through cold deformation and prepared from passive alloys, in particular stainless steel, without sensitisation occurring in the workpiece and thereby provide a better corrosion resistance. It is a further object that the strengthening effect obtained is comparable to or possibly even larger than the strengthening effect obtained by cold deformation.

DESCRIPTION OF THE INVENTION

The present invention relates to a method for solution hardening of a cold deformed workpiece of a passive alloy containing at least 10% chromium, which method comprises
dissolving at least nitrogen in the workpiece at a temperature T1, which is higher than the solubility temperature for carbide and/or nitride and lower than the melting point of the passive alloy, wherein dissolution of nitrogen at temperature T1 is performed to obtain a diffusion depth in the range of 50 μm to 5 mm, and
cooling the workpiece after the dissolution step at temperature T1 to a temperature which is lower than the temperature at which carbides and/or nitrides form in the passive alloy, wherein the cooling step takes place in an inert gas not containing nitrogen.

The method of the invention may also be viewed as a method for solution hardening of a cold deformed workpiece of a passive alloy, which method comprises the steps of:
dissolving at least nitrogen in the workpiece at a temperature T1, which is higher than the austenisation temperature and lower than the melting point of the passive alloy,
cooling the workpiece after the dissolution step to a temperature which is lower than the temperature at which carbides and/or nitrides form in the passive alloy, wherein the cooling step takes place in an inert gas not containing nitrogen.

In a preferred example the first dissolution step is performed in a gas, such as a gas containing $N_2$, e.g. substantially pure $N_2$ without other gasses than unavoidable impurities, and the cooling step is also performed in a gas, which is an inert gas not containing nitrogen (an nitrogen-free inert gas) with argon being particularly preferred. In the context of the invention an "inert gas" is a gas that does not contain any substantial amount of molecules which interact with elements of the alloy; any inert gas not containing nitrogen is contemplated in the invention, or mixtures of gasses. When an inert gas is employed in the cooling step it has surprisingly been found that the workpiece treated in the method of the invention has a corrosion resistance, which is even superior to the corrosion resistance obtained using other cooling gases, or when the cooling step is performed using other methods. In particular, gasses containing nitrogen are believed to accelerate formation of nitrides when the cooling is performed in a gas containing nitrogen compared to cooling in an inert gas, so that a more robust and flexible method is provided with a cooling step using an inert gas. The partial pressure of nitrogen in the treatment at temperature T1 determines the solubility of nitrogen, so that the higher the partial pressure of nitrogen in the treatment at temperature T1 the more pronounced is the effect of cooling in an inert gas not containing nitrogen. Cooling in an nitrogen-free inert gas may also allow longer cooling times than 60 s, but preferably cooling is performed an nitrogen-free inert gas in less than 30 s, such as in less than 10 s.

In a specific embodiment the method further provides formation of expanded austenite and/or expanded martensite in the cold deformed workpiece of the passive alloy. Thus, the method may further comprise a subsequent second step of dissolving nitrogen and/or carbon in the workpiece at a temperature T2 of at least 300° C., which temperature T2 is lower than the temperature at which carbides and/or nitrides form in the passive alloy.

The first step of dissolving nitrogen in the workpiece at a temperature higher than the solubility temperature for nitride significantly improves the core strength of the passive alloy, such as stainless steel, in comparison to only re-crystallisation annealing of the material prior to low temperature hardening. The high temperature dissolution of nitrogen is done at temperatures above the austenisation temperature of the alloy, e.g. at least or above 1050° C. and below the melting point of the alloy. The strengthening effect of this high-temperature nitriding is, surprisingly, sufficient to compensate for the loss of strength caused by annihilating the cold deformation while the workpiece is kept at the high temperature during nitriding. Furthermore, the high-temperature nitriding allows that low temperature hardening can be performed at higher temperatures than usual without creating problems with formation of nitrides and/or carbides, and that it is easier to activate the passive surface on the material at the subsequent low temperature surface hardening process. Thus, the formation of the hardened zone is accelerated. Furthermore, better corrosion characteristics are obtained, since nitrogen exists in solid solution.

A significant improvement of the hardening of passive alloys can be obtained by the high temperature dissolution of nitrogen followed by low temperature nitriding, carburising or nitrocarburising. Any passive alloy in which expanded austenite or expanded martensite may form is relevant to the invention, and stainless steel is preferred, in particular cold deformed austenitic stainless steel.

The optional subsequent low temperature dissolution of nitrogen and/or carbon, which takes place at temperatures below the temperature at which carbides and/or nitrides form in the passive alloy, such as below 450-550° C. dependent on the process, may in the subsequent step be carried out on a material, which does not contain plastic deformation, but which has a strength on level with a plastically deformed workpiece. This means that the risk of sensitisation is reduced significantly. The presence of nitrogen and optionally carbon in solid solution in stainless steel have even been found to give a faster low temperature process, than can be obtained using methods of the prior art, since the diffusion coefficients of nitrogen and carbon increase with increasing carbon/nitrogen content. Thus, in certain examples the passive alloy is a stainless steel containing nitrogen and/or carbon.

With the present invention it is possible to carry out a low temperature hardening of passive materials, and in particular stainless steel, of even strongly cold deformed components without occurrence of sensitisation of the material and without loss of strength. Cold deformed material treated with the method of the invention can obtain a significantly better corrosion resistance than untreated material. Conducted experiments have shown that the strength which is obtained by dissolution of nitrogen and optionally carbon in stainless steel at high temperature, typically above 1050° C., may give a (core) strength or substrate bearing capacity, which is sufficient to compensate for the loss of strength which occurs when the cold deformation is removed by recrystallisation while heating to and maintaining the high temperature during nitriding. That is, although the strength obtained from cold deformation is lost, this loss is compensated by the strength obtained from solution hardening with nitrogen and optionally carbon. Even relatively small amounts of nitrogen give a significant increase of strength to provide the bearing capacity, which is necessary for wear resistant expanded austenite.

The method of the present invention provides manufactured members having at least the same strength as cold deformed members and at the same time better corrosion resistance, and further provides the advantage of taking less time to perform.

Dissolution at temperature T1 and at the optional temperature T2 may be performed using any appropriate technology. For example dissolution at temperature T1 and at temperature T2 may be performed in a gaseous process, e.g. using a gas containing nitrogen, such as ammonia, preferably $N_2$. Dissolution may also be performed using ion implantation, salt bath or plasma. It is preferred that dissolution at temperature T1 and temperature T2 are carried out using gas, since this is a cheap and efficient solution and because all types of geometries may be treated uniformly, and there is a good temperature uniformity. Moreover, the use of a gas process means that the process is within the framework of the laws of thermodynamics, which means that there are very well controlled processing conditions. It is further an advantage to employ gas because it has surprisingly been found that the high temperature process of the invention makes the surface easier to activate using gas in the low temperature process. It is thus easier to remove the impermeable oxide layer (passive layer), which is found on passive materials after a high temperature dissolution. It is assumed that this is attributable to the presence of nitrogen and optionally carbon which is dissolved at high temperature.

The optional low temperature process may be carried out immediately after the high temperature process, but this is not mandatory. It is also possible to perform the two processes with an offset in time and place. If the processes are carried out immediately after each other with the cooling step between the first and the second dissolution step, it is possible to avoid that a passivation of the surface occurs and hence activation prior to the low temperature process is superfluous. Thus, the invention also relates to an example wherein dissolution at temperature T2 takes place immediately after cooling from temperature T1 without the passivation/activation of the surface in-between the execution of the high temperature process and the low temperature process. This may be done in the same furnace. When using gas the relevant gases containing nitrogen and/or carbon for use in the low temperature process may be supplied immediately when the material is cooled to temperature T2. However, the cooling is advantageously done using argon without any nitrogen present during cooling. An advantage of using gaseous processing is that it is possible to use gases, which do not activate the surface at temperature T2 in the low temperature process. Other advantages of this example are that the hardening process thereby can be made cheaper and quicker.

An advantage of the method of the invention is that better corrosion characteristics are obtained, since nitrogen exists in solid solution. Dissolution of carbon does not change the corrosion characteristics. The material may be considered to be a nitrogen-containing alloy, if the component is fully saturated with nitrogen. This will often be the case for thin-walled workpieces, e.g. workpieces with a material thickness of up to 4 mm, such as a thickness of 2-4 mm, which are treated with the method of the invention. Stainless steel workpieces which are treated with the method of the invention therefore have a far better corrosion resistance compared to workpieces, which solely are treated with the low temperature process (see the examples). An aspect of the invention relates to a thin-walled component, or workpiece, of a cold deformed metal or alloy treated according to the method of the invention.

For thin-walled components the material may be fully saturated with nitrogen by the high temperature process. In thick material a surface zone of up to several millimeters, e.g. up to about 5 mm, may be obtained where nitrogen is in solid solution. In both cases the bearing capacity of the material will be increased and comparable to what may be obtained by cold deformation. In an example of the invention, which allows that workpieces with a thickness of up to about 10 mm are fully saturated with nitrogen so that particularly strong workpieces are obtained. In general, the method provides that a thickness of expanded austenite or expanded martensite of at least 5 μm is obtained in the workpiece, and the hardness of the expanded austenite zone or the expanded martensite zone is at least 1000 HV, such as more than 1050 HV.

The method may further comprise that dissolution at temperature T2 takes place immediately after cooling from dissolution at temperature T1 without the occurrence of a passivation of the surface. In a certain example cooling after the first dissolution process at temperature T1 takes place especially quickly, e.g. in a period of no more than 60 second, in the temperature interval in which there is the largest tendency for sensitisation and formation of precipitations, such as nitrides and/or carbides, for the relevant alloy. For stainless steel it has been found that this in particular takes place in the interval from 900 to 700° C. where the material should be cooled quickly. In one embodiment the workpiece is cooled from 900 to 700° C. in less than 60 seconds. In a preferred embodiment the workpiece is cooled from 900 to 700° C. in less than 30 seconds. Thereby the formation of carbides and/or nitrides is substantially avoided, and this is an advantage since these can react with the alloying elements in stainless steel, such as chromium. The depletion of alloying elements from solid solution and binding of these as nitrides and/or carbides is suppressed and the corrosion resistance characteristics are maintained.

In general, the features of the methods of the invention may be combined freely, and all such combinations are contemplated in the present invention. For example, all features and variations discussed for the first dissolution step at temperature T1 are relevant also when the method comprises a second dissolution step at temperature T2. Likewise, all features discussed for the subsequent step of dissolving nitrogen and/or carbon in the workpiece at a temperature T2, which is lower than the temperature at which carbides and/or nitrides form in the passive alloy are relevant for any combination of features for the first dissolution step at temperature T1 and the cooling in an inert gas.

In another aspect the invention relates to a member solution hardened by the method of the invention. Any workpiece may be treated in the method, although it is preferred that the workpiece has a thickness of up to about 10 mm, since this will provide that the resulting member is fully saturated with nitrogen. Members which are solution hardened according to a method of the invention may be used in any technological field. Fields of particular relevance comprise members for use in the technical areas of medico, food, automotive, chemical, petrochemical, pharmaceutical, marine, package, watches, cutlery/tableware, medical, energy, pulp & paper, mining or waste water technologies. Members of particular interest comprise valves (butterfly valves, ball valves, control valves), steering bolts, nuts, washers, fasteners, nozzles, pumps, machinery components, semiconductor ASML, ferrule parts, ball bearings and bearing gages, pneumatic parts, membranes etc.

In a further aspect the invention relates to a member solution hardened by the method according to the invention, where the member is a valve part or a part used in a valve.

In a further aspect the invention relates to a member solution hardened by the method according to the invention, where the member forms an outer surface area of a design object, such as a clips for holding paper or notes, a sign plate, a holder, a lid of a box, cutlery, a watch, or a plate mounted together with a handle or a plate forming part of a lamp.

In a further aspect the invention relates to a member solution hardened by the method according to the invention, where the member is part of a bearing, such as a part of a ball bearing, a part of a roller bearing, or a bearing cage.

In a further aspect the invention relates to a member solution hardened by the method according to the invention, where the member is part of medical equipment, or medical instruments, or dental equipment, or dental instruments, or is a medical instrument or a dental instrument.

In a further aspect the invention relates to a member solution hardened by the method according to the invention, where the member is part of pharmaceutical equipment, such as a plate, a nozzle, a shim, a pipe, or a grid.

In a further aspect the invention relates to a member solution hardened by the method according to the invention, where the member is part of a car, such as a plate, a part in the exhaust system, a filter part, an engine part, a fixture, a handle, or a part having a decorative surface.

DEFINITIONS

In the context of the present invention the terms "expanded austenite" and "expanded martensite" describe an austenite or martensite, respectively, which has been supersaturated with nitrogen or carbon, or nitrogen and carbon (with respect to nitride or carbide formation). Expanded austenite and expanded martensite may be specified as nitrogen-expanded or carbon-expanded, or the expansion may be specified as nitrogen- and carbon-expanded. However, in the context of the invention "expanded austenite" and "expanded martensite" generally refer broadly to austenite or martensite, respectively, expanded with nitrogen, carbon or any combination of nitrogen and carbon. A review of expanded austenite is provided by T. L. Christiansen and M. A. J. Somers (2009, *Int. J. Mat. Res.*, 100: 1361-1377), the contents of which are hereby included by reference. Any alloy in which "expanded austenite" or "expanded martensite" may be formed is contemplated for the method of the invention. Expanded austenite or expanded martensite may form in the surface of an alloy when the alloy is subjected to solution of nitrogen or carbon, or nitrogen and carbon, and the expanded austenite or expanded martensite may also be referred to as a "zone" of expanded austenite or expanded martensite. In the context of the present invention the term "zone" should be understood in relation to the thickness of the treated material so that "zone" is comparable to the thickness of expanded austenite or expanded martensite. The method of the invention provides that a thickness of expanded austenite or expanded martensite of at least 5 μm is obtained in the workpiece; the thickness of the expanded austenite or expanded martensite may be up to about 50 μm or higher.

In terms of the invention an "alloying element" may refer to a metallic component or element in the alloy, or any constituent in the analysis of the alloy. In particular, alloys of relevance in the method of the invention comprise an element that may form nitrides and/or carbides with present nitrogen and carbon, respectively. The method of the invention advantageously provides a surface free from nitrides and carbides of alloying elements. It is however also contemplated in the invention that an alloy may comprise only a single metallic element capable of forming nitrides and/or carbides. An alloy may also comprise other elements, such as semi-metallic elements, inter-metallic elements, or non-metallic elements. Alloying elements capable of forming nitrides and/or carbides may typically be metallic elements providing corrosion resistance to the alloy due to formation of a passive oxide layer with the alloying element. The terms "nitride" and "carbide" as used in the context of the invention refer to nitrides and carbides formed between alloying elements and nitrogen and carbon, respectively. An exemplary nitride is chromium nitride, CrN or $Cr_2N$ although terms "nitride" and "carbide" are not limited to nitrides and carbides with chromium.

By the term "passive" in connection with alloys or metals is to be understood an alloy, which has an oxide layer on the surface. The alloy can be both self-passivating or be passivated as a consequence of a process to which the alloy is subjected. Belonging to the group of self-passivating alloys are those, which have a strong affinity to oxygen (e.g. Cr, Ti, V), including alloys containing such alloying elements (e.g. stainless steel which essentially is an Fe-based alloy containing at least 10.5% Cr).

By the term "cold deformation" (also named "cold working") is to be understood a plastic deformation induced in the material by external forces at a temperature below the recrystallisation temperature of the material. Cold deformation may be provided by an actual plastic shape change, such as forging, extrusion, shaping, drawing, pressing, or rolling, and may also be caused by machining such as turning, milling, punching, grinding or polishing etc., or by a combination of these processes.

By the term "sensitisation" is to be understood that nitrogen or carbon have formed nitrides and carbides, respectively, by reaction with one or more alloying elements otherwise utilized to form the protective oxide layer on the surface, as for example chromium in stainless steel. When sensitisation occurs, the free content of the alloying element, such as chromium, in solid solution is lowered to a level, which is no longer sufficient to maintain a complete protective oxide layer, which means that the corrosion characteristics are deteriorated.

By the term "solubility temperature for carbide and/or nitride" is to be understood the temperature at which nitrides/carbides are not stable, and where already formed nitrides/carbides are dissolved. In general, alloys comprising metallic alloying elements capable of forming nitrides and/or carbides will have a temperature interval in which nitrides and/or carbides may form when nitrogen and carbon, respectively, are present. Thus, above this temperature interval, nitrides and carbides will not form, and already formed nitrides/carbides are dissolved. When nitrides or carbides exist, i.e. sensitisation has occurred, these carbides can generally only be removed by exposing the sensitised metal to a temperature above the austenisation temperature. Furthermore, such alloys have a temperature below the temperature interval, where nitrides and carbides will not form, although nitrides or carbides already formed in an alloy cannot be removed at the low temperature.

The "austenisation temperature" is typically the temperature used when heat treating an alloy in order to dissolve carbides, and "austenisation temperature" may thus correspond to the "solubility temperature for carbide". At the austenisation temperature the alloy is in the austenitic phase. The temperature at which a steel alloy changes phase from ferrite to austenite is typically at a somewhat lower temperature than the austenisation temperature.

The austenisation temperature as well as the temperature at which carbides and/or nitrides form in a passive alloy are generally well-known to the skilled person. Likewise the temperature below which nitrides or carbides will not form is generally known to the skilled person. Furthermore the melting temperature of the alloy is generally known to the skilled person. The temperatures may depend on the composition of the passive alloy, and for any given composition these temperatures are furthermore easily determined experimentally by the skilled person.

The alloying contents mentioned are expressed in percent by weight. With respect to compositions of alloys or of gas unavoidable impurities may naturally also be present, even if this is not specifically mentioned.

Further Description of the Invention

Figure 1:
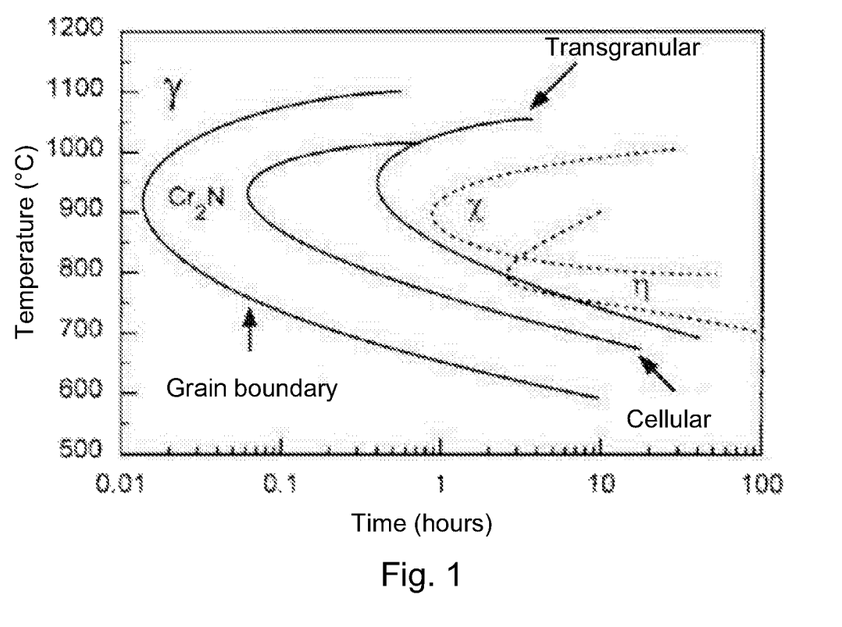
FIG. 1 shows an isothermal transformation diagram (TTT diagram) for a nitrogen-containing austenitic stainless steel.

FIG. 1 shows an example of an isothermal transformation diagram (TTT diagram) for a nitrogen-containing austenitic stainless steel; the stainless steel has the composition Fe-19Cr-5Mn-5Ni-3Mo-0.024C-0.69N (from J. W. Simmons, PhD thesis, Oregon Graduate Institute of Science and Technology 1993). In FIG. 1 the temperature interval in which nitrides may begin to form is indicated with "$Cr_2N$". In the method of the invention the step of dissolving nitrogen in the passive alloy is thus performed at a temperature T1 above the austenisation temperature and the workpiece is cooled to a temperature, which is lower than the temperature at which carbides and/or nitrides form in the passive alloy in an inert gas not containing nitrogen. The method may comprise a second step of dissolving nitrogen and/or carbon, which is performed at a temperature T2 below the temperature interval where nitrides and/or carbides can form. Thus, temperature T1 is higher than temperature T2. The workpiece is cooled, e.g. within a time span of 60 seconds, after the first dissolution step at temperature T1 to a temperature which is lower than the temperature at which carbides and/or nitrides form in the passive alloy. The passive alloy of the workpiece will thus be stabilised with respect to formation of nitrides and/or carbides, and the optional second dissolution step may then be performed as desired. The austenisation temperature may also be referred to as "high" temperature in the context of the invention. Likewise, the temperature below the temperature at which carbides and/or nitrides form is also referred to as "low" temperature.

The method of the invention comprises steps of dissolving nitrogen and/or carbon in the passive alloy. The step of dissolving nitrogen may also be referred to as the "dissolution of nitrogen" or "nitriding", and likewise step of dissolving carbon may also be referred to as the "dissolution of carbon" or "carburising". When both nitrogen and carbon are dissolved in the same process step may be referred to as "nitrocarburising".

In a certain aspect the invention relates to a member solution hardened by the method of the invention. In the contexts of the invention "treated" should be understood broadly. In particular, the term "treated" means that method of the invention has been employed in the manufacture of the member. Thus, the invention also relates to a member manufactured using the method of the invention and the terms "treated in" and "manufactured using" may be used interchangeably. The method of the invention may be the last step in the manufacture of the member or a member treated by the method may also be subjected to further processing steps to provide the final member.

In the context of the present invention a "thin-walled component" is a component of a size allowing the component to be fully saturated with nitrogen and/or carbon in the method of the invention. Thus, a "thin-walled component" may have a material thickness, e.g. in its smallest dimension, of up to, and including, about 10 mm, such as a thickness of about 2 mm to about 4 mm or a thickness in the range from 0.2 mm to 8 mm, or a thickness in the range from 0.4 mm to 6 mm, or a thickness in the range from 0.5 mm to 5 mm, or a thickness in the range from 1.5 mm to 4.5 mm. The method may be used with any thin-walled component.

The novel and unique way in which one or more of the above aims is obtained, is by the provision of a method for solution hardening of a cold deformed workpiece of a passive alloy containing at least 10% chromium, which method comprises dissolving at least nitrogen in the workpiece at a temperature T1, which is higher than the solubility temperature for carbide and/or nitride and lower than the melting point of the passive alloy, wherein dissolution of nitrogen at temperature T1 is performed to obtain a diffusion depth in the range of 50 μm to 5 mm, and cooling the workpiece after the dissolution step at temperature T1 to a temperature which is lower than the temperature at which carbides and/or nitrides form in the passive alloy, wherein the cooling step takes place in an inert gas not containing nitrogen. The method may further comprise a subsequent second step of dissolving nitrogen and/or carbon in the workpiece at a temperature T2 of at least 300° C., which temperature T2 is lower than the temperature at which carbides and/or nitrides form in the passive alloy.

The invention is especially suitable for stainless steels and comparable alloys, where expanded austenite or martensite can be obtained in a low temperature dissolution process. In general, alloys based on iron, nickel and/or cobalt comprising chromium are relevant for the method. The chromium content may vary and may as an example be up to about 10%. In other examples the chromium content may be at about 10% or at least 10%. Thus, the invention in one example relates to a method for solution hardening of a cold deformed workpiece of stainless steel. Nitrogen and optionally also carbon can be dissolved in the stainless steel at a temperature, which is higher than the austenisation temperature of the stainless steel, e.g. the solubility temperature for carbide and/or nitride for present alloying elements, such as chromium. Even relatively small amounts of nitrogen give a significant increase in strength to provide a load bearing capacity, which is necessary for wear resistant expanded austenite. In an example of the invention the hardness of the expanded austenite zone or the expanded martensite zone is at least 1000 HV.

In an example of the invention the stainless steel is an austenitic steel. This material is relatively soft compared to e.g. martensitic stainless steel. Therefore, it is especially advantageous for this material that nitrogen and optionally carbon is dissolved at the high temperature process. Thereby, it is obtained that the austenitic steel receives a sufficient core strength to compensate for the loss of strength, which takes place when the cold deformation is annihilated and that it is then possible to dissolve nitrogen and/or carbon at low temperature without problems with precipitation, such as nitrides and/or carbides. In further examples of the invention the passive alloy is selected from the group comprising stainless steel, austenitic stainless steel, martensitic stainless steel, ferritic stainless steel, precipitation hardenable (PH) stainless steel or ferritic-austenitic stainless steel; a ferritic-austenitic stainless steel may also be referred to as a duplex stainless steel.

The content of nitrogen and optionally carbon, which is dissolved at the high temperature process in stainless steel will typically be less than 1% by weight, but may, if desired, be higher. This may e.g. be obtained by applying a higher nitrogen and optionally carbon activity, for example in the form of a higher partial pressure of $N_2$ in a gaseous process. The content of nitrogen and/or carbon, which is obtained in stainless steel at the low temperature dissolution may be as high as 14% by weight and 6% by weight, respectively.

In a preferred example the above dissolution of nitrogen and/or carbon takes place at the temperature T1 using gas, which contains nitrogen and optionally carbon, but it may also be performed by ion implantation, plasma assistance or by salt bath. In a preferred example a nitrogen containing gas, such as $N_2$, is used. The pressure of the gas may be up to several bar, but it may also be below 1 bar, such as 0.1 bar. It is an advantage to employ gas, since all types of geometries may be treated uniformly and there is a good temperature uniformity.

In an example of the invention dissolutions are performed at temperature T1 and temperature T2 using gas. The gasses contain nitrogen and/or carbon, and the gas employed in the cooling step is an inert gas not containing nitrogen. In certain examples dissolution at temperature T2 is performed in a process selected from the group comprising a gas-based process, ion implantation, salt bath or plasma.

In an example of the invention a diffusion depth of 50 μm to 5 mm is obtained by dissolution of nitrogen and optionally carbon at temperature T1. This provides both a hard surface and a strengthening of the core of the material. Thereby a full hardening of thin-walled components with a material thickness comparable with, or up to about twice the dissolution depth, may be obtained since dissolution normally takes place from both sides of the workpiece. For thicker components a relatively thick surface zone where nitrogen and optionally carbon is in solid solution is obtained. This provides support for the expanded austenitic layer, which is formed in the surface in the subsequent low temperature process. For thin-walled workpieces a full nitriding/carburising/nitrocarburising of the workpiece may thus be obtained. Even if this is not fully obtained the dissolution will be a significant advantage, especially for thin-walled workpieces, where strict requirements to the corrosion resistance, and to the bearing capacity, are relevant, since these are improved significantly in the method of the invention.

In an example of the invention the temperature T1 is above 1000° C., such as at least 1050° C., or it may be at least 1100° C., such as 1120° C. or 1160° C., at least 1200° C., or at least 1250° C. The upper limit for the temperature is below the melting point of the treated materials. For stainless steel the melting point is about 1600° C. In an example of the invention temperature T1 is below 1600° C., such as below 1500° C., or below 1400° C., such as below 1350° C. In an example of the invention temperature T1 is in the range of 1050 and 1300° C., such as at about 1150° C. It is important that the temperature is higher than the solubility temperature for the relevant carbides and/or nitrides, which may potentially be formed in the material, but however below the melting point of the treated material. When gas is employed in dissolution at temperature T1 the employed temperature may be chosen with consideration to the gas mixture and the applied gas pressure.

In another example of the invention carbon is dissolved at temperature T2, and temperature T2 is below 550° C., preferably the range of 300-530° C. during carburising.

In yet another example of the invention nitrogen is dissolved at temperature T2, and temperature T2 is below 500° C., such as below 470° C., preferably the range of 300-470° C. during nitriding.

In yet another example of the invention nitrogen and carbon are dissolved at temperature T2, and temperature T2 is below 500° C., such as below 470° C., preferably the range of between 300-470° C. during nitrocarburising.

In an example of the invention the high temperature dissolution is carried out at temperature T1 for at least 20 min, such as for at least 30 minutes, or for at least 1 hour, or for at least 1.5 hours, or for at least 2 hours or for at least 3 hours, or for at least 4 hours, or for at least 5 hours, or for at least 10 hours or for at least 15 hours. In principle there is no upper time limit, since no nitrides or carbides are formed at temperature T1. At extended treatment the material may, depending on its thickness, be saturated with nitrogen and optionally carbon, i.e. be fully nitrided or nitrocarburised.

In an example of the invention the method comprises cooling the material to ambient temperature after the dissolution at temperature T1. It is particularly preferred that the second dissolution step at temperature T2 is performed immediately after the cooling step; this will avoid passivation of the workpiece, i.e. formation of an oxide layer. In an example of the invention the cooling takes place under high pressure, such as in the range of 6 and 10 bar, such as at 7 bar or at 8 bar, or at 9 bar. The cooling takes place in an inert gas not containing nitrogen, such as a noble gas, e.g. helium (He), neon (Ne), argon (Ar), krypton (Kr), xenon (Xe), or radon (Rn), or any mixture of these, with argon being particularly preferred. In another example cooling takes place in argon at high pressure, e.g. in the range of 4 and 20 bar, such as in the range of 6 and 10 bar, such as at 7 bar or at 8 bar, or at 9 bar.

The invention further relates to a lock washer (see FIGS. 2a and 2b) of stainless steel for securing bolts and nuts, which is dissolution hardened using the method of the invention. The lock washer is relatively thin-walled, so that by hardening the lock washer using the method of the invention a significant and necessary improvement of both strength and corrosion resistance of the lock washer is obtained. In an embodiment of the invention the lock washer has a first side with radial teeth and an opposite other side, the camside, with cams. The lock washers are used in pairs mounted with the cams against each other to obtain a key lock effect. They are especially suitable to effectively lock bolt assemblies which are exposed to extreme vibrations or dynamic loads and to corrosive environment, such as salt water. There are therefore strong requirements to the strength and corrosion resistance of these washers.

The invention is especially suitable for stainless steels and comparable alloys, in which expanded austenite or martensite can be obtained at a low temperature dissolution process. The invention is, however, generic in nature: a high temperature dissolution process with nitrogen and optionally carbon in passive alloys, such as iron-based alloys, cobalt-based alloys, nickel-based alloys or chromium-based alloys, which provides strength and an improved low temperature dissolution process with respect to corrosion, processing rate and strength.

The following examples and prior art examples with accompanying figures explain the invention in further detail.

Prior Art Example 1

Hardening of key lock washers of cold deformed austenitic stainless steel, AISI 316, by two methods of the prior art.

Figure 2A:
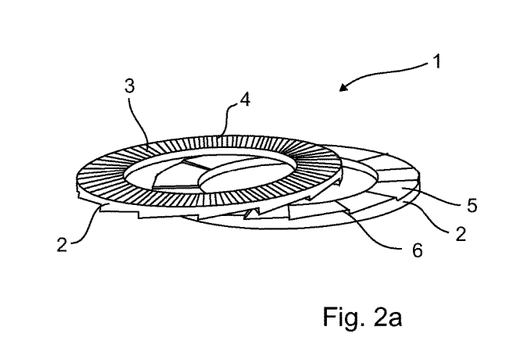
FIG. 2a shows a set of lock washers.
Figure 2B:
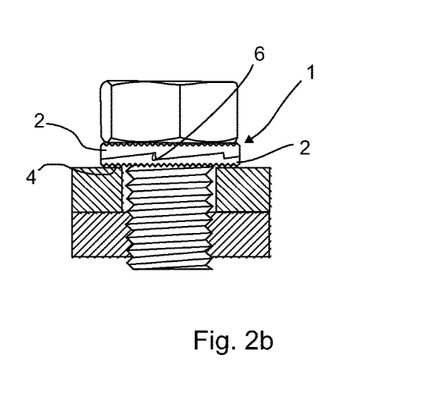
FIG. 2b shows a set of lock washers with a bolt and nut.
Figure 3:
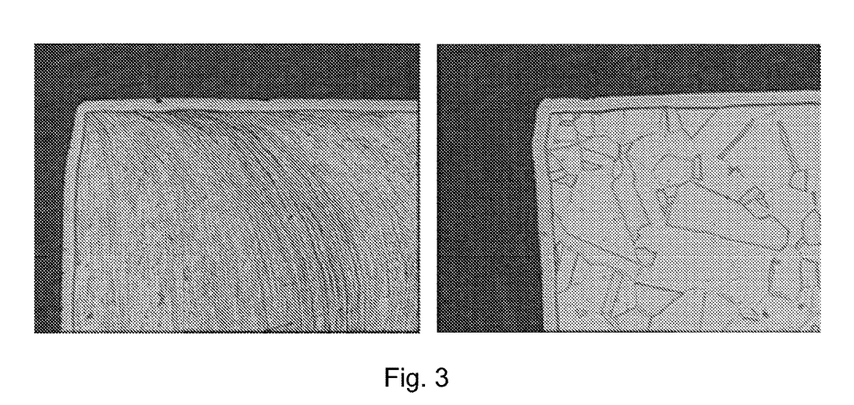
FIG. 3 shows photomicrographs of a lock washer treated in two prior art methods.
Figure 4:
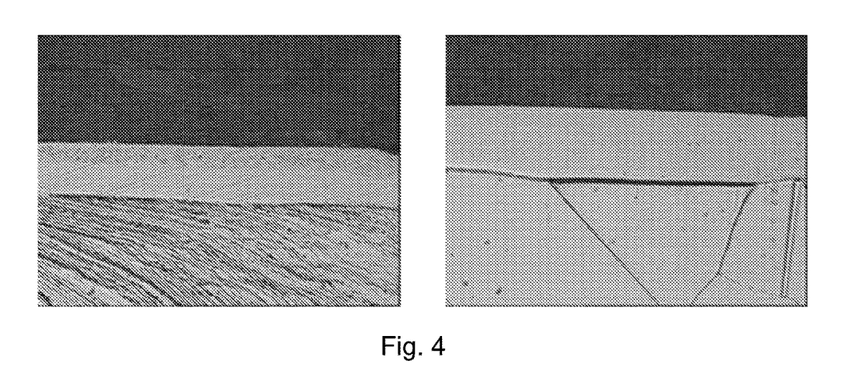
FIG. 4 shows photomicrographs of a lock washer treated in two prior art methods.

Two identical key lock washers of cold deformed austenitic stainless steel AISI 316L were hardened. FIG. 2 shows a key lock washer set 1 of said key lock washers 2 and illustrates the use of these. Each washer 2 has a first side 3 with radial teeth 4 and an opposite other camside 5 with cams 6. During use of the key lock washer set 1 the washers 2 are placed as shown with the camsides 5 facing each other. The two key lock washers were solution hardened with nitrogen and carbon at a temperature of 440° C. One washer was hardened by a method disclosed in PA 2011 70208, i.e. in a high temperature process and subsequently in a low temperature process, and the other washer was directly surface hardened with the same low temperature process, i.e. of the prior art. The washers were analysed with optical microscopy. FIG. 3 and FIG. 4 in the left panel show the washer, which was only surface hardened with a nitrocarburising process conducted using a gas containing nitrogen and carbon at a temperature of 440° C. for 16 hours at atmospheric pressure. The outer surface in the nitrogen containing zone appears partly sensitised (chromium nitride precipitations). The deformed substrate appears strongly deformed and becomes clearly influenced by the employed etching liquid to development of the micro structure. FIG. 4 shows an enlarged version of FIG. 3.

FIG. 3 and FIG. 4 in the right panel show the washer treated by the method disclosed in PA 2011 70208. The washer was exposed to a nitrogen containing atmosphere ($N_2$ gas) at a temperature above 1050° C. and was subsequently quickly cooled in the same gas. Thereby the material was austenitised completely and the material was fully saturated with nitrogen. Then the washer was surface hardened with a nitrocarburising process conducted using a gas containing nitrogen and carbon at a temperature of 440° C. for 16 hours at atmospheric pressure, whereby expanded austenite was formed in the surface in a zone with a thickness of at least 5 μm. The nitrocarburised nitrogen-containing zone was not sensitised and the substrate was clearly without cold deformation. The substrate hardness (260-300 HV0.5) and the surface hardness (1200-1400 HV0.005) in the two washers are however practically identical. The corrosion resistance (exposure time in salt spray chamber (ISO 9227)) of the washer, where the method disclosed in PA 2011 70208 was employed, is many times better than for the washer which was only surface hardened (time in the chamber until corrosion was observed). The washer which was treated with the method disclosed in PA 2011 70208 did not exhibit corrosion after 400 hours whereas the washer which was directly low temperature hardened did exhibit clearly visible corrosion already after 20 hours. A further improvement in the corrosion resistance can be obtained while retaining the other advantageous characteristics by exposing the washer to a nitrogen containing atmosphere ($N_2$ gas) at a temperature above 1050° C.

and subsequently quickly cooling in an inert atmosphere not containing nitrogen, e.g. argon, instead of cooling in the nitrogen containing atmosphere.

Prior Art Example 2

Hardening of cold deformed austenitic stainless steel, AISI 316, by a method of the prior art and a method disclosed in PA 2011 70208.

Figure 5:
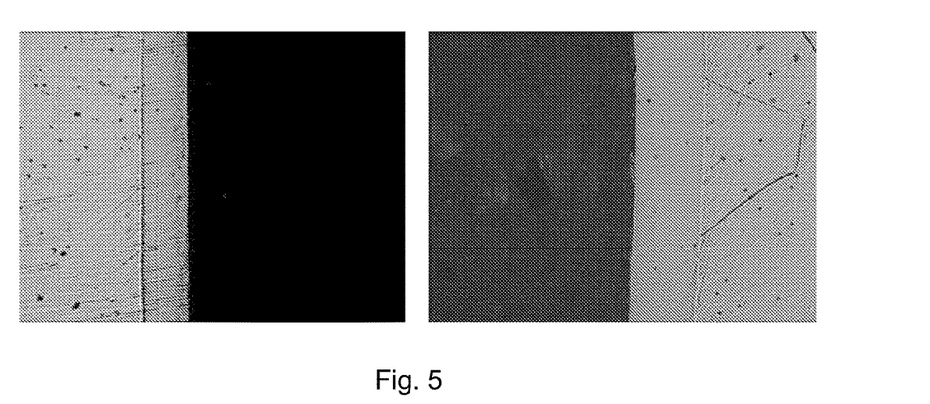
FIG. 5 shows photomicrographs of a sample of AISI 316 treated in two prior art methods.

Two identical components (back ferrules) of cold deformed austenitic stainless steel AISI 316 were solution hardened with nitrogen and carbon at a temperature of 440° C. One component was hardened by a method disclosed in PA 2011 70208, i.e. in a high temperature process and subsequently in a low temperature process and the other component was directly surface hardened with the same low temperature process. FIG. 5 in the left panel shows the microstructure analysed with optical microscopy of a component, which was only surface hardened with a nitrocarburising process conducted using a gas containing nitrogen and carbon at a temperature 440° C. for 12 hours. The outer surface in the nitrogen containing zone appears partly sensitised with clear precipitations of CrN in the outermost surface. FIG. 5 in the right panel shows a component treated with the method disclosed in PA 2011 70208. The component was exposed to a nitrogen containing atmosphere ($N_2$ gas) at a temperature above 1050° C. and was subsequently quickly cooled in the same gas. Then the component surface was hardened with a nitrocarburising process in a low temperature process conducted using a gas containing nitrogen and carbon at a temperature of 440° C. for 12 hours. The nitrocarburised nitrogen containing zone was not sensitised. The substrate hardness (260-300 HV0.5) and the surface hardness (1200-1400 HV0.005) in the two components are, however, practically identical. The total layer thickness of the expanded austenite zone is in both cases approximately 20 μm. The outermost layer is nitrogen expanded austenite, and the innermost layer is carbon expanded austenite. The corrosion resistance for both components was tested in a 14% by weight sodium hypochlorite solution. The component which was treated with the method disclosed in PA 2011 70208 did not exhibit corrosion after 24 hours, whereas the component, which was directly low-temperature hardened exhibited clear corrosion after only 10 minutes. The component where the method disclosed in PA 2011 70208 was employed thus differs in having a significantly better corrosion resistance than the workpiece, which was directly nitrocarburised. A further improvement in the corrosion resistance can be obtained while retaining the other advantageous characteristics by exposing the ferrule to a nitrogen containing atmosphere ($N_2$ gas) at a temperature above 1050° C. and subsequently quickly cooling in an inert atmosphere not containing nitrogen, e.g. argon, instead of cooling in the nitrogen containing atmosphere.

Prior Art Example 3

Hardening of cold deformed Austenitic Stainless steel AISI 304 plate by a method of the prior art and a method disclosed in PA 2011 70208.

Figure 6:
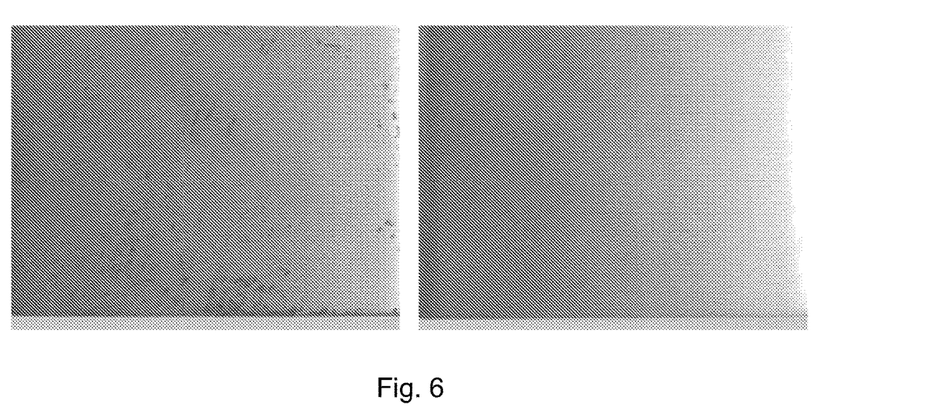
FIG. 6 shows photomicrographs of a sample of AISI 304 treated in two prior art methods.

Two identical components of cold rolled (deformed) austenitic stainless steel plate, AISI 304, were solution hardened with nitrogen and carbon at a temperature of 440° C. One component was hardened by a method disclosed in PA 2011 70208, i.e. in a high temperature process and subsequently in a low temperature process and the other component was directly surface hardened with the same low temperature process. FIG. 6 in the left panel shows a component, which was only surface hardened with a nitrocarburising process conducted using a gas containing nitrogen and carbon at a temperature of 440° C. for 20 hours and subsequently corrosion tested by exposure to 14% by weight sodium hypochlorite solution for 70 minutes. FIG. 6 in the right panel shows the component hardened with the method disclosed in PA 2011 70208. The component was exposed to a nitrogen containing atmosphere ($N_2$ gas) at a temperature of 1150° C. for 30 minutes and was subsequently cooled quickly in the same gas. Then the component was surface hardened with a nitrocarburising process conducted using a gas containing nitrogen and carbon at a temperature of 440° C. for 20 hours. Finally the component was exposed to corrosion test by exposure to 14% by weight sodium hypochlorite solution. The surface appears unaffected by the corrosion test even after 16 hours of exposure. In the component which was directly low temperature hardened clear corrosion attacks are seen after short term exposure/corrosion test (70 minutes). The component where the method disclosed in PA 2011 70208 was employed thus differs in having a much better corrosion resistance. A further improvement in the corrosion resistance can be obtained while retaining the other advantageous characteristics by exposing the component to a nitrogen containing atmosphere ($N_2$ gas) at a temperature above 1050° C. and subsequently quickly cooling in an inert atmosphere not containing nitrogen, e.g. argon, instead of cooling in the nitrogen containing atmosphere.

Example 1

Hardness profiles of cold deformed Stainless steel treated by a method of the prior art and a method of the invention.

Figure 7:
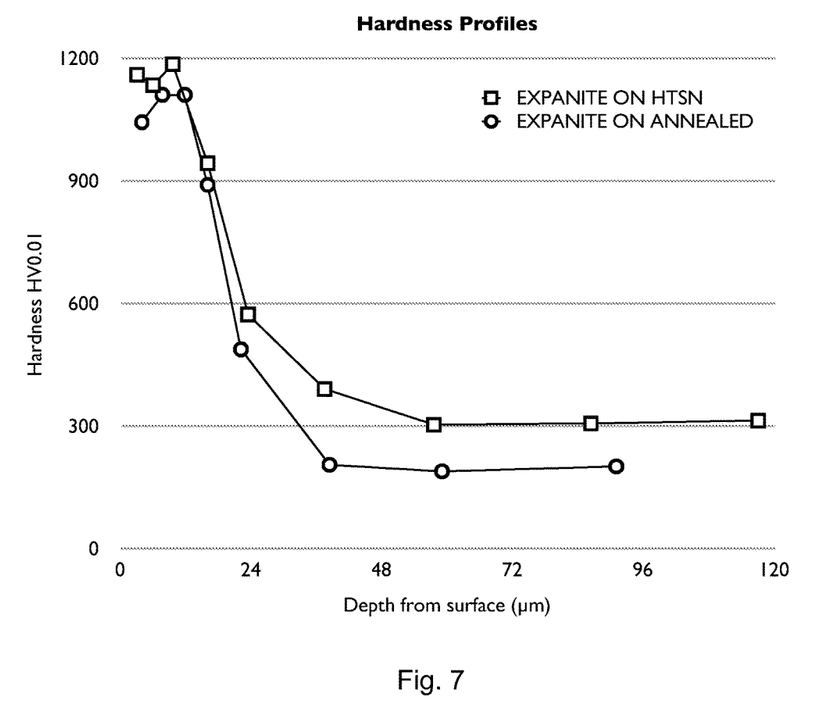
FIG. 7 shows hardness profiles of stainless steel treated in a prior art method and by the method of the invention.

Two identical components of cold deformed austenitic stainless steel were treated in a method of the prior art and according to the method of the invention. The samples were exposed to a nitrogen containing atmosphere ($N_2$ gas) or to an atmosphere of hydrogen ($H_2$) at a temperature above 1050° C. and were subsequently cooled quickly in the argon (for the $N_2$-treated sample) or $H_2$ gas. The component surfaces were then hardened by nitrocarburising in a low temperature process conducted using a gas containing nitrogen and carbon at a temperature of 440° C. for 12 hours. The nitrocarburised zones were not sensitised. The hardness profiles of the samples were analysed and the results are shown in FIG. 7. It is evident from FIG. 7 that the sample treated at high temperature in the nitrogen containing atmosphere ("EXPANITE ON HTSN") retained the core strength of the material whereas the core strength was annihilated in the high temperature annealing in hydrogen ("EXPANITE ON ANNEALED").

Example 2

Argon cooling following high-temperature solution hardening with nitrogen.

Figure 8:
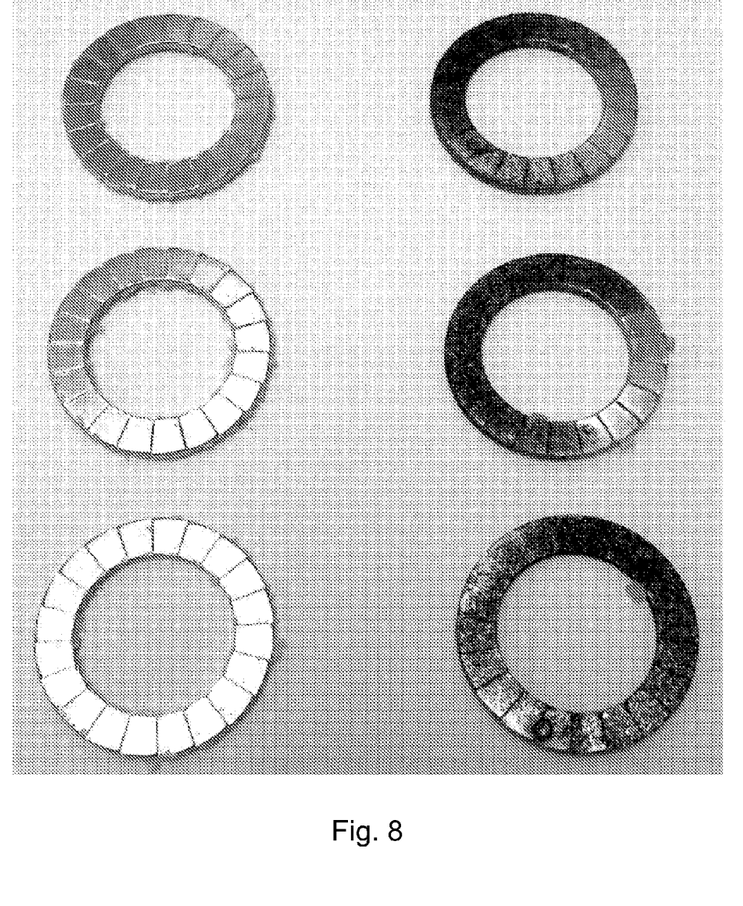
FIG. 8 shows lock washers treated in the method of the invention and in a prior art method.

Lock washers of cold deformed austenitic stainless steel, AISI 316L, as described in Prior Art Example 1 and illustrated in FIG. 2 were exposed to a nitrogen containing atmosphere ($N_2$ gas) at a temperature above 1050° C. before quickly cooling to ambient temperature in either the same atmosphere or an atmosphere of argon. The samples were not subjected to further surface hardening. The corrosion resistance of the components was tested in a 14% by weight sodium hypochlorite solution. FIG. 8 shows three exemplary lock washers cooled in argon (left side) and three lock washers cooled in nitrogen (right side). The argon cooled lock washers had far superior corrosion resistance than lock washers cooled in nitrogen, which showed clear signs of corrosion.

Example 3

Hardening of cold deformed austenitic stainless steel, AISI 316, component by a method of the prior art and a method of the invention.

The corrosion resistance of cold deformed austenitic stainless steel AISI 316 treated according to the invention was compared with a similar component treated with a process of the prior art. The corrosion testing was performed by submerging the two surface hardened components into 14% by weight sodium hypochlorite solution for 18 hours.

Figure 9:
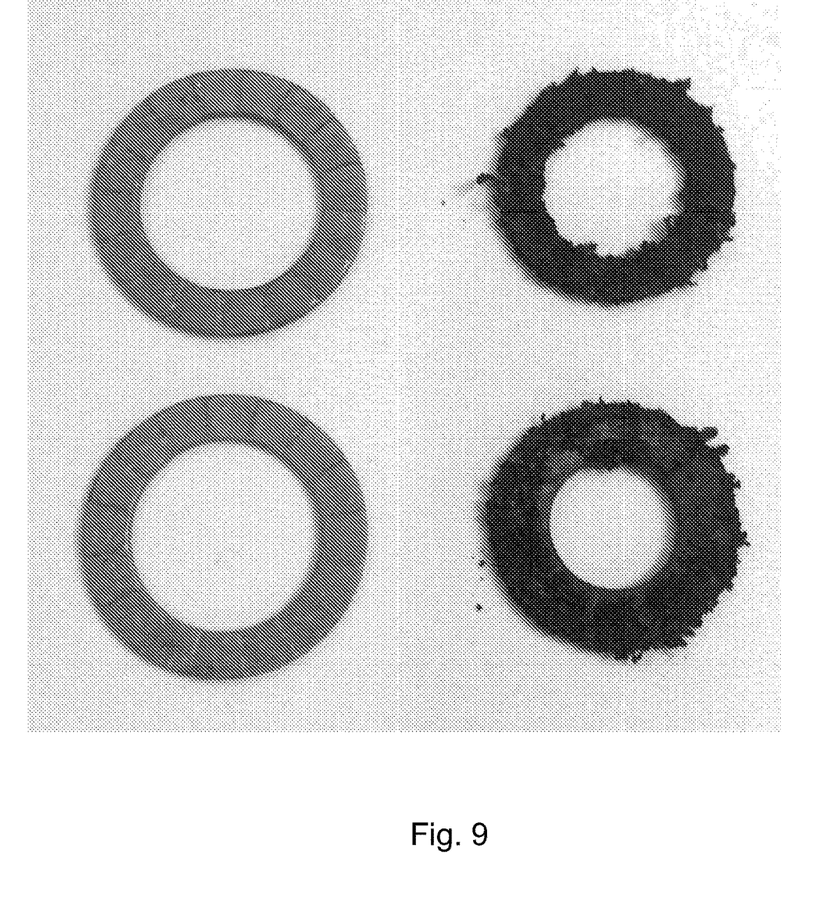
FIG. 9 shows photomicrographs of samples of AISI 316 treated in a prior art method (right) and by the method of the invention (left).

FIG. 9 in the left panel shows the component treated according to the invention, i.e. in a high temperature process and subsequently, after cooling in argon, in a low temperature process and the other component in the right panel was directly surface hardened solely with a low temperature process.

The surface of the component treated according to the invention appears unaffected by the corrosion test even after 18 hours of exposure. In the component which was treated according to the prior art, corrosion attacks were observed after short term exposure (7 minutes). The component where the method of the invention was employed thus differs in having a much better corrosion resistance.

The invention claimed is:

1. A method for solution treating a cold deformed workpiece of an alloy based on iron, nickel and/or cobalt and containing at least 10% chromium, the method comprising:
    dissolving at least nitrogen in the workpiece at a temperature T1, which is above 1020° C. and lower than the melting point of the alloy, wherein the dissolving of nitrogen at the temperature T1 is performed to obtain a diffusion depth in a range of 50 μm to 5 mm; and
    cooling the workpiece after the dissolving at the temperature T1 to a temperature which is below 550° C., wherein cooling from a temperature of 900° C. to a temperature of 700° C. is performed in less than 60 seconds, and wherein the cooling of the workpiece after the dissolving at the temperature T1 to the temperature which is below 550° C. takes place in an inert gas not containing nitrogen.

2. The method according to claim 1, further comprising a subsequent second step of dissolving nitrogen and/or carbon in the workpiece at a temperature T2 of at least 300° C.

3. The method according to claim 2, wherein the dissolving at the temperature T2 is performed in a process selected from a gas-based process, ion implantation, salt bath or plasma.

4. The method according to claim 2, wherein the dissolving at the temperature T1 and the dissolving at the temperature T2 are performed using a gas.

5. The method according to claim 2, wherein carbon is dissolved at the temperature T2, and the temperature T2 is in a range of 300 to 530° C.

6. The method according to claim 2, wherein nitrogen is dissolved at the temperature T2, and the temperature T2 is in a range of 300 to 500° C.

7. The method according to claim 2, wherein nitrogen and carbon are dissolved at the temperature T2, and the temperature T2 is in a range of 300 to 470° C.

8. The method according to claim 2, wherein a thickness of expanded austenite or expanded martensite of at least 5 μm is obtained in the workpiece.

9. The method according to claim 2, wherein a hardness of the expanded austenite zone or the expanded martensite zone is at least 1000 HV.

10. The method according to claim 2, wherein the dissolving at the temperature T2 takes place immediately after the cooling of the workpiece after the dissolving at the temperature T1, without occurrence of a passivation of the surface.

11. The method according to claim 1, wherein the inert gas is selected from helium (He), neon (Ne), argon (Ar), krypton (Kr), xenon (Xe), or radon (Rn), or any mixture of helium (He), neon (Ne), argon (Ar), krypton (Kr), xenon (Xe), and/or radon (Rn).

12. The method according to claim 1, wherein the inert gas apart from unavoidable impurities is argon.

13. The method according to claim 1, wherein nitrogen and carbon are dissolved at temperature T1.

14. The method according to claim 1, wherein the alloy is austenitic stainless steel or ferritic-austenitic stainless steel.

15. The method according to claim 1, wherein the dissolving at the temperature T1 is performed using a gas containing nitrogen.

16. The method according to claim 1, wherein the temperature T1 is in a range of 1050° C. to 1300° C.

17. The method according to claim 1, wherein the workpiece is a lock washer of stainless steel for securing a fixing part.

18. The method according to claim to 17, wherein the lock washer has a first side with radial teeth and an opposite other side with cams.

19. The method according to claim 1, wherein the workpiece is: a part used in a valve; an outer surface area of a design object; a part of a bearing; a part of medical equipment; a part of dental equipment; a medical instrument; a dental instrument; a part of pharmaceutical equipment; or a part of a car.

20. A method of producing a corrosion resistant member, the corrosion resistant member being of an alloy based on iron, nickel and/or cobalt and comprising at least 10% chromium, the corrosion resistant member having a thickness of up to 10 mm, the method comprising the steps of:
    providing a cold deformed workpiece of an alloy based on iron, nickel and/or cobalt and comprising at least 10% chromium, the workpiece having a thickness of up to 10 mm;
    dissolving at least nitrogen in the workpiece at a temperature T1, which is above 1020° C. and lower than the melting point of the alloy, wherein the dissolving of nitrogen at the temperature T1 is performed to obtain a diffusion depth in a range of 50 μm to 5 mm; and
    cooling the workpiece after the dissolving at the temperature T1 to a temperature which is below 550° C., wherein cooling from a temperature of 900° C. to a temperature of 700° C. is performed in less than 60 seconds, and wherein cooling of the workpiece after the dissolving at the temperature T1 to the temperature which is below 550° C. takes place in an inert gas not containing nitrogen.

21. The method according to claim to 20, wherein the corrosion resistant member is a lock washer of stainless steel for securing a fixing part.

22. The method according to claim to 21, wherein the lock washer has a first side with radial teeth and an opposite other side with cams.

23. The method according to claim 20, wherein the workpiece or the corrosion resistant member is: a part used in a valve; an outer surface area of a design object; a part of a bearing; a part of medical equipment; a part of dental equipment; a medical instrument; a dental instrument; a part of pharmaceutical equipment; or a part of a car.

24. The method according to claim 20, wherein the alloy is selected from austenitic stainless steel or ferritic-austenitic stainless steel.

* * * * *